Aug. 25, 1970  J. C. PRUNESKI  3,525,536

VEHICLE SAFETY APPARATUS POSITIONED ON STEERING WHEEL

Filed Oct. 11, 1968  3 Sheets-Sheet 1

INVENTOR.
JAMES C. PRUNESKI
BY
Yound, Flynn & Tarolli
ATTORNEYS

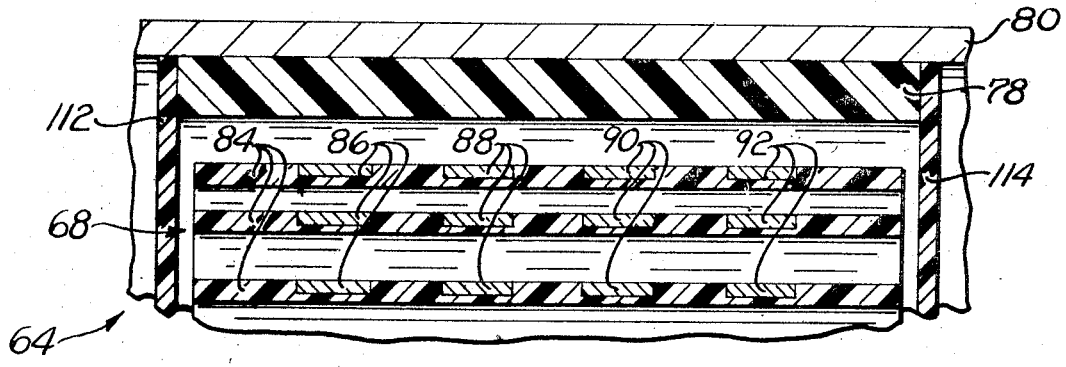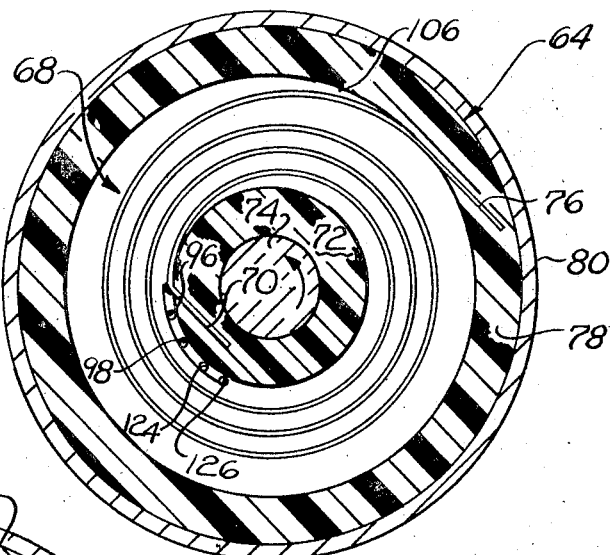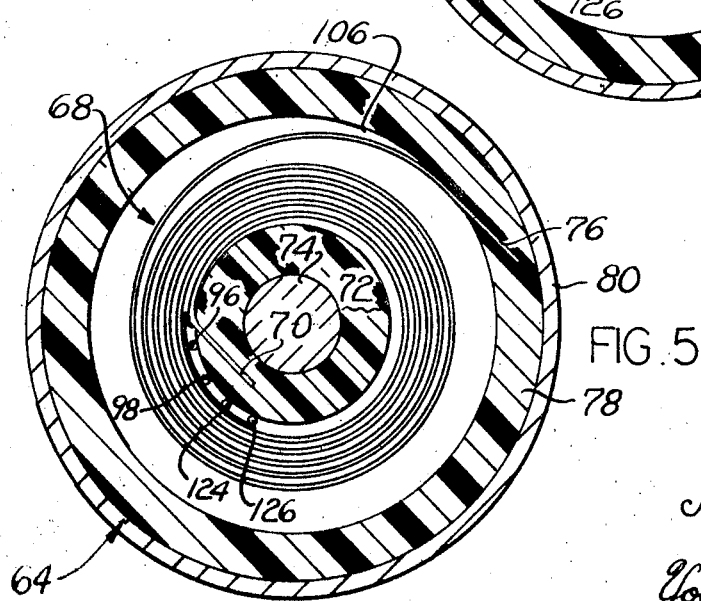

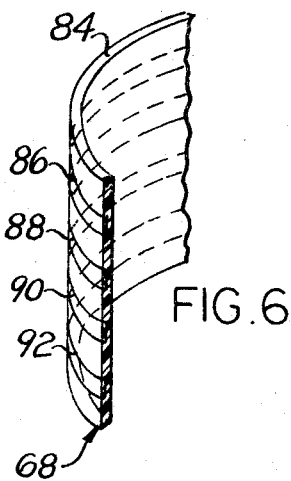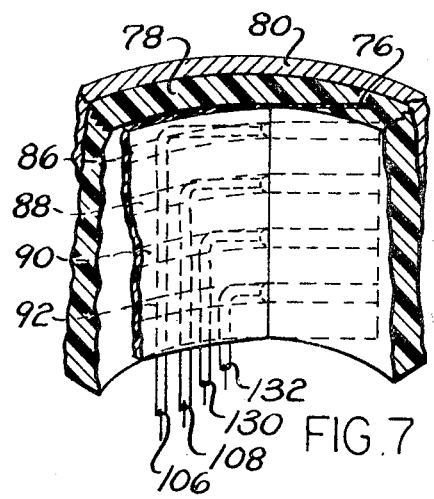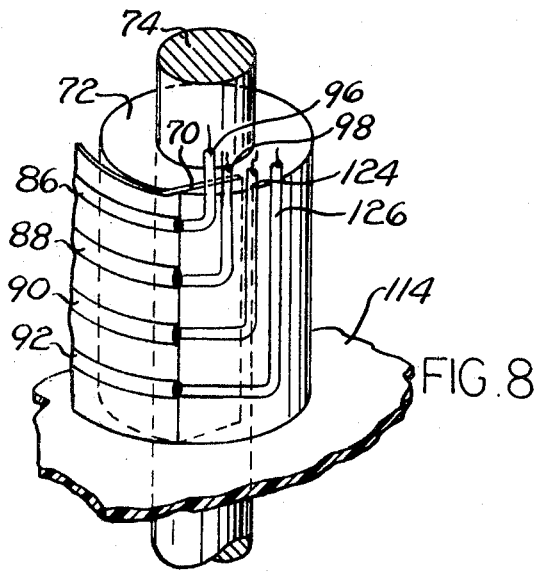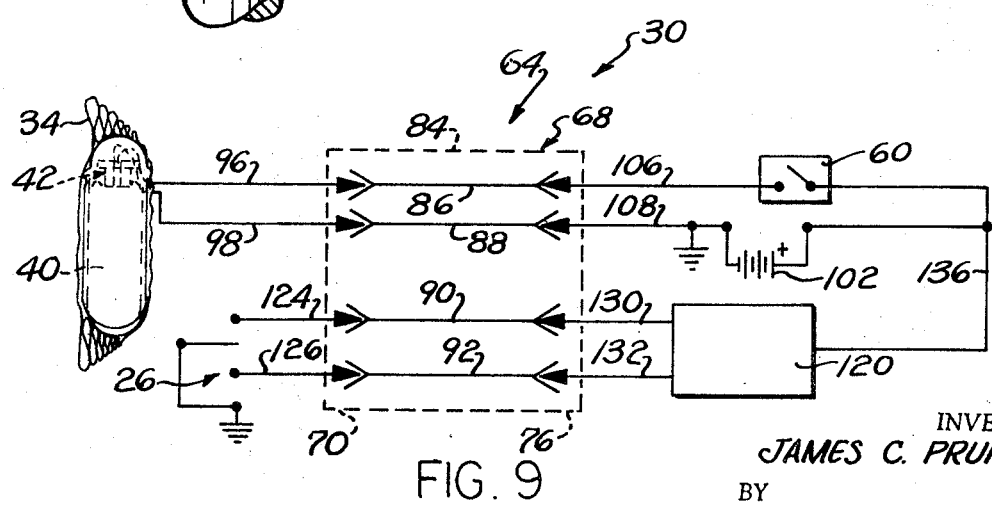

United States Patent Office 3,525,536
Patented Aug. 25, 1970

---

3,525,536
VEHICLE SAFETY APPARATUS POSITIONED ON STEERING WHEEL
James C. Pruneski, Madison Heights, Mich., assignor to Eaton Yale & Towne Inc., Cleveland, Ohio, a corporation of Ohio
Filed Oct. 11, 1968, Ser. No. 766,867
Int. Cl. B60r 21/00
U.S. Cl. 280—150                                      11 Claims

---

ABSTRACT OF THE DISCLOSURE

An improved vehicle safety apparatus includes a safety device mounted on the steering wheel of the vehicle for protecting the driver of the vehicle during an accident, a sensor assembly for detecting the occurrence of an accident, and electrical circuitry interconnecting the safety device and the sensor assembly. This electrical circuitry includes flexible printed circuitry having slack which is taken up or decreased by rotation of the steering wheel in one direction and re-established or increased by rotation of the steering wheel in the opposite direction. One end of the flexible printed circuitry is connected to wires or conductors leading to the safety device. The opposite end of the flexible printed circuitry is connected to wires or conductors leading to the sensor assembly. The flexible printed circuitry is also used to electrically connect turn signals or other devices with actuators mounted on the steering wheel.

---

This invention relates generally to a safety apparatus, and more particularly to steering wheel mounted safety apparatus which is electrically connected with apparatus mounted on other parts of the vehicle.

A safety device for protecting the driver of the vehicle is advantageously mounted on the steering wheel of the vehicle along with actuator means for the horn, turn signals, or other driver controlled apparatus associated with the vehicle. The steering wheel mounted safety device and actuator means is electrically connected with associated devices mounted on other parts of the vehicle by electrical circuitry extending through the steering column. The electrical circuitry must include a connector or coupling assembly which provides for relative rotation between the steering wheel and steering column while maintaining an electrical connection between the apparatus on the steering wheel and the associated apparatus mounted on other parts of the vehicle. Since the available space in the steering column is relatively limited and since the steering wheel is rotated through many revolutions during the life of a vehicle, the coupling assembly must be both compact and reliable in operation.

Accordingly, it is an object of this invention to provide a steering wheel mounted safety device having an electrical connection with other parts of the vehicle through a new and improved electrical coupling which is both compact and adapted to enable the steering wheel to be rotated relative to the steering column.

Another object of this invention is to provide a new and improved safety apparatus including a steering wheel mounted safety device for protecting the driver of a vehicle during an accident and a compact electrical connection between the steering wheel mounted safety device and a sensor assembly mounted on another part of the vehicle for detecting the occurrence of an accident.

Another object of this invention is to provide vehicle safety apparatus wherein a safety device for protecting the driver of the vehicle during an accident and an actuator means for controlling signaling equipment are both mounted on a steering wheel of the vehicle, the safety device and actuator means being electrically connected with other parts of the vehicle in a new and improved manner by flexible printed circuitry having one end which is rotated with the steering wheel and an opposite end which is secured to the steering column.

These and other objects and features of the invention will become more apparent upon a consideration of the following description taken in connection with the accompanying drawings wherein:

FIG. 3 is an enlarged sectional view, taken along the line 3—3 of FIG. 2, further illustrating the structure of the electrical coupling or connector assembly;

FIG. 4 is an enlarged fragmentary view illustrating the structure of flexible printed circuitry forming a part of the electrical coupling of FIG. 2;

FIG. 5 is a sectional view, generally similar to FIG. 3, illustrating the relationship of the flexible printed circuitry to the steering post and steering column housing when the steering wheel is turned;

FIG. 6 is an enlarged fragmentary schematic view of a portion of the flexible printed circuitry of FIG. 4;

FIG. 7 is an enlarged fragmentary schematic view illustrating the connection of an end portion of the flexible printed circuitry with an anchor ring fixedly mounted on the steering column housing;

FIG. 8 is an enlarged fragmentary schematic view illustrating the connection of an end portion of the flexible printed circuitry with an anchor mounted for rotation with the steering wheel; and FIG. 9 is a schematic illustration showing the electrical circuitry for connecting the steering wheel mounted apparatus with apparatus mounted on other parts of the vehicle.

The present invention provides a vehicle safety apparatus including a steering wheel mounted safety device for protecting the driver of the vehicle during an accident and a sensor assembly for detecting the occurrence of an accident. The sensor assembly is mounted on one part of the vehicle and, upon the occurrence of an accident, actuates the safety device by energizing electrical circuitry extending between the safety device and sensor assembly. This electrical circuitry includes flexible printed circuitry which forms an electrical coupling or connection between the steering wheel mounted safety device and the sensor assembly. This flexible printed circuitry provides slack which is decreased or taken up by rotation of the steering wheel and safety device in one direction and is increased or re-established by rotation of the steering wheel in an opposite direction. In addition to maintaining an electrical connection between the safety device and sensor assembly, the flexible printed circuitry electrically connects steering wheel mounted actuators or switches with driver controlled devices such as the vehicle turn signals or horn.

Figure 1:
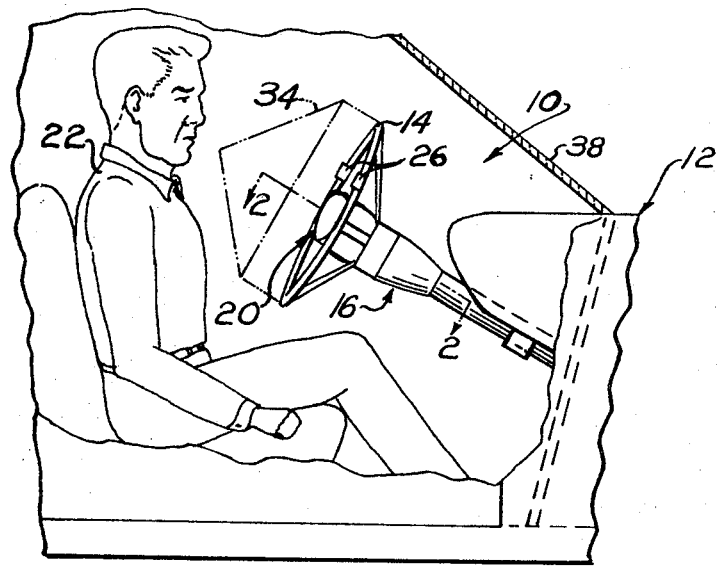
FIG. 1 is a schematic illustration of a vehicle having a safety device mounted on the steering wheel of the vehicle.

Although a safety apparatus constructed in accordance with the present invention can be used in many different types of vehicles, such as trucks, tractors, boats and airplanes, a safety apparatus 10 constructed in accordance with the present invention is illustrated in FIG. 1 in association with an automotive vehicle 12 having a steering wheel 14 mounted for rotation relative to a steering column or steering wheel support assembly 16. A safety device 20 is mounted on the steering wheel 14 for protecting a driver 22 of the vehicle during an accident. In addition to the safety device 20, suitable actuators or switch means 26 are advantageously mounted on the steering wheel 14 to facilitate the operation of signaling devices, such as the vehicle turn signals or horn, by the driver 22. The safety device 20 and actuators or switches 26 are electrically connected with associated apparatus mounted on other parts of the vehicle by electrical circuitry 30 (see FIGS. 2 and 9) which extends through the steering column 16 to the associated apparatus.

Figure 2:
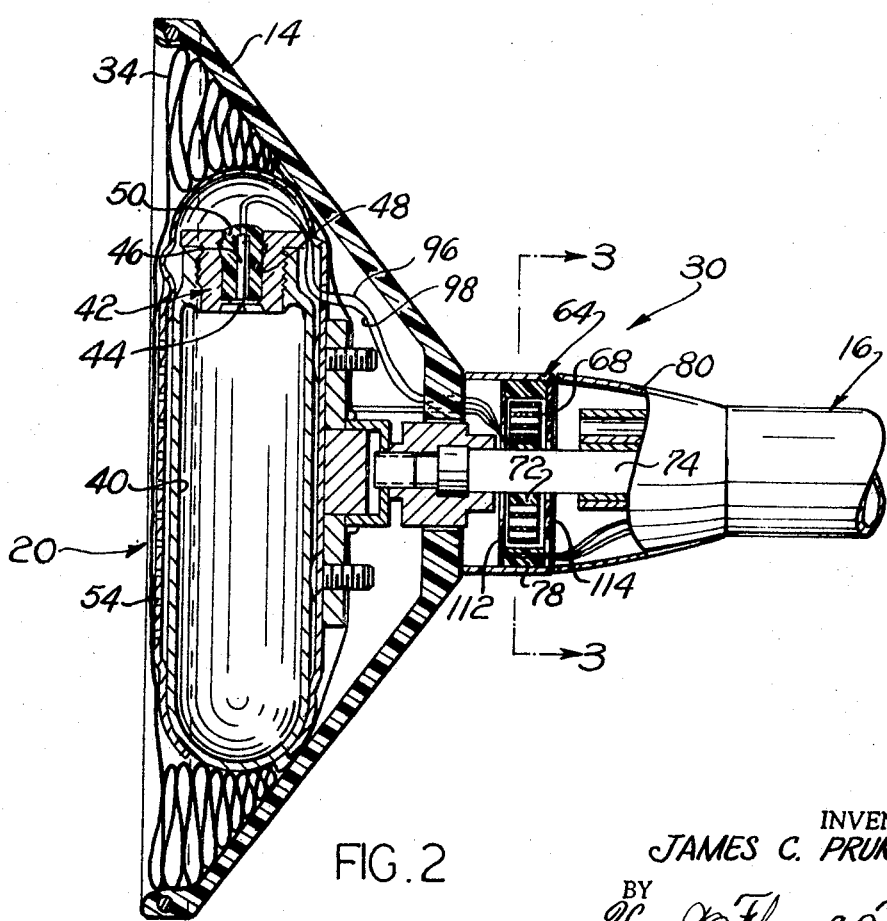
FIG. 2 is a schematic illustration, taken generally along the line 2—2 of FIG. 1, illustrating the mounting of the safety device on the steering wheel and the relationship of an electrical coupling or connector assembly with the steering wheel and the steering column.

Operation of the safety device 20 results in an expansible confinement 34 being inflated from a collapsed condition, shown in FIG. 2, to an expanded or operative condition, shown in dashed lines in FIG. 1. In the expanded condition, the confinement 34 restrains movement of the driver 22 relative to the steering wheel 14 and windshield 38 to thereby protect the driver during an accident. To provide for the expansion of the confinement 34, the safety device 20 includes a source of fluid, in the illustrated embodiment a reservoir 40 (FIG. 2), which is mounted on the steering wheel 14 of the vehicle. An explosive valve assembly 42 is mounted on the reservoir 40 and is operated from the illustrated closed condition blocking a flow of fluid from the reservoir to an open condition by rupturing or releasing the wall 44 of the valve assembly. The wall 44 is ruptured by detonating electrically activated blasting caps 46 or other suitable explosive charges. The blasting caps 46 are retained in a fluid passageway 48 by a highly incompressible, friable, or fragmentable material 50.

Upon detonation of the blasting caps 46, the material 50 is fragmented and the wall 44 tends to break or rupture to enable the fluid to flow from the reservoir 40 through the passageway 48 to inflate the confinement 34 from the collapsed condition of FIG. 2 to the expanded condition shown in dashed lines in FIG. 1. A diffuser 54 is advantageously associated with the reservoir 40 to direct this flow of fluid to inflate the confinement 34 in a predetermined manner. The mounting of the reservoir 40, diffuser 54, and confinement 34 on the steering wheel 14 is more fully disclosed in application Serial No. 674,810 filed on Oct. 12, 1967 by Richard Chute and entitled "Vehicle Safety Device." The operation of the explosive valve assembly 42 is more fully explained in application Ser. No. 730,024 filed on May 17, 1968 by George H. Ekstrom and entitled "Vehicle Safety Apparatus." Therefore, to avoid needless prolixity of description, the mounting of the safety device 20 on the steering wheel 14 and the operation of the explosive valve assembly 42 will not be further described herein.

The electrical circuitry 30 activates the source of fluid (i.e. the reservoir 40) to inflate the confinement 34 upon the vehicle 12 being involved in an accident such as a collision. To this end, the electrical circuitry 30 includes a sensor assembly 60, illustrated schematically in FIG. 9 and of a known construction. The sensor assembly 60 is operated in response to a condition of an accident, such as deceleration of the vehicle 12 or deformation of a part of the vehicle, to energize the electrical circuitry 30. Energization of the electrical circuitry 30 detonates the blasting caps 46 in a known manner to operate the explosive valve assembly 42 from the illustrated closed condition of FIG. 1 to an open condition in which fluid is free to flow from the reservoir 40, through the diffuser 54, to inflate the confinement 34 to the expanded condition illustrated in dashed lines in FIG. 1. In the expanded condition, the confinement 34 protects the driver 22 of the vehicle 12 by restraining his movement during the accident. Of course, the electrical circuitry 30 could be associated with safety devices of a type other than the illustrated safety device 20.

During operation of the vehicle 12, the steering wheel 14 is rotated relative to the steering column or steering wheel support assembly 16 to control the direction of movement of the vehicle. To enable the safety device 20 to be rotated with the steering wheel 14 relative to the steering column 16, the electrical circuitry 30 includes an electrical coupling or connector assembly 64 (see FIGS. 2, 3, and 4). The coupling assembly 64 electrically connects the steering wheel mounted safety device 20 with the sensor assembly 60 (FIG. 9) which is mounted on another part of the vehicle 12, such as the frame or fire wall.

The electrical coupling assembly 64 includes flexible printed circuitry 68 having a first or inner end portion 70 (FIG. 3) connected to an inner anchor ring 72 on the steering shaft or post 74. Therefore, the end portion 70 rotates with the steering wheel 14 relative to the steering column 16 when the steering wheel is rotated to vary, in a known manner, the direction of movement of the vehicle 12. An outer end portion 76 of the flexible printed circuitry is connected to outer anchor ring 78 mounted on a housing 80 of the steering column 16. To enable the steering wheel 14 and inner end portion 70 of the flexible printed circuitry 68 to be rotated relative to the steering column 16 and outer end portion 76 of the flexible printed circuitry, the flexible printed circuitry is loosely coiled in a spiral between a housing 80 of the steering column 16 and the steering post 74 with the central axis of the spiral coaxial with the central axis of the steering post and the anchor rings 72 and 78.

Upon rotation of the steering wheel 14 to vary the direction of movement of the vehicle 12, the slack in the loosely wound printed circuitry 68 is either decreased or increased, depending upon the direction of rotation of the steering wheel. The position of the flexible printed circuitry 68 when the vehicle 12 is traveling straight ahead is schematically illustrated in FIG. 3.

When the steering wheel 14 is rotated in a counterclockwise direction to turn the vehicle 12 toward the left, as viewed by the driver 22, the end portion 70 of the flexible printed circuitry 68 is rotated relative to the end portion 76 to take up or decrease the slack in the printed circuitry so that it assumes a condition similar to that shown in FIG. 5. Upon subsequent rotation of the steering wheel 14 in a clockwise direction or toward the driver's right, the slack in the flexible printed circuitry 68 is reestablished or increased as the steering wheel is turned back toward the position in which the vehicle is traveling straight ahead. Thus, by varying the amount of slack in the loosely spiraled printed circuitry 68, the steering wheel 14 can be rotated relative to the steering column 16 while maintaining an electrical connection between the safety device 20 and the sensor assembly 60 through the flexible printed circuitry. Of course, the flexible printed circuitry 68 could be loosely arranged between the steering column housing 80 and the steering post 74 in a configuration other than the illustrated spiral configuration.

Since the steering wheel 14 will, in all probability, be rotated through a large number of revolutions before the vehicle 12 is involved in an accident, the flexible printed circuitry 68 must be relatively strong and break resistant in order to maintain a reliable electrical connection between the sensor assembly 60 and the safety device 20. To this end, the flexible printed circuitry 68 includes a flexible substrate or strip 84 of "Mylar," or other suitable polymeric material, upon which a plurality of flexible conductors 86, 88, 90 and 92 are disposed in a generally parallel relationship (see FIGS. 4 and 6–9). The conductors 86 and 88 are electrically connected with the safety device 20 by leads or wires 96 and 98 (FIGS. 8 and 9) and are connected with the sensor assembly 60 and a suitable source of power, such as a battery 102, by leads or wires 106 and 108. (FIGS. 7 and 9.)

From the foregoing description it is apparent that the safety device 20 is continuously connected with the sensor assembly 60 through the first pair of leads 96 and 98, the conductors 86 and 88 of the flexible printed circuitry 68, and the second pair of leads 106 and 108 which extend through the steering column 16. Since the relatively strong substrate 84 and conductors 86 and 88 are flexible, the printed circuitry 68 enables the steering wheel 14 and safety device 20 to be rotated relative to the steering column 16 and sensor assembly 60 without breaking or interrupting the electrical connection therebetween. This maintenance of the electrical connection while the steering wheel is being rotated is particularly important since the vehicle 12 can become involved in a collision at any time during the rotation of the steering wheel.

When the steering wheel 14 is rotated in the counterclockwise direction, adjacent turns of the printed circuitry 68 are moved toward each other and may even be brought into engagement (see FIG. 5). The dielectric substrate 84 electrically insulates adjacent turns of the printed circuitry so that the conductors 86 through 92 are not short circuited. A pair of dielectric plates or discs 112 and 114 (FIGS. 2 and 4) are located in abutting engagement with opposite ends of the outer anchor ring 78 to protect the printed circuitry 68 against being shorted out by foreign articles. The discs 112 and 114 are advantageously spaced from opposite ends of the inner anchor ring 72 to enable the steering wheel 14 to rotate freely relative to the steering column 16 to which the outer anchor ring 78 and discs 112 and 114 are connected.

In addition to the safety device 20, actuators or switches 26 are advantageously mounted on the steering wheel 14 for actuating the vehicle turn signals, horn or other signal device, indicated schematically at 120 in FIG. 9. The actuators 26 are electrically connected with the turn signals 120 by inner leads or wires 124 and 126 (FIGS. 8 and 9) which are in turn connected to conductors 90 and 92 of the flexible printed circuitry 68. The turn signals 120 are connected by leads or wires 130 and 132 (FIGS. 7 and 9) to the turn signals 120 which are also connected to the battery by a lead 136. Operation of either one of the actuators 26 completes the circuit for energizing the associated turn signal, indicated schematically at 120 (FIG. 9).

The flexible printed circuitry 68 enables a substantial number of conductors to be disposed in a relatively close relationship so that a number of driver operated devices, similar to the turn signals 120, can be electrically connected through the flexible circuitry with suitable steering wheel mounted actuators. This compact circuitry is particularly advantageous in the present environment since the space between the steering column housing 80 and the steering post 74 is relatively limited. Of course, the flexible substrate 84 can be provided with additional conductors for use in circuits other than those described herein.

In view of the foregoing remarks, it can be seen that the electrical circuitry 30 includes a new and improved electrical coupling 64. The coupling 64 electrically connects the steering wheel mounted safety device 20, for protecting the driver 22 of the vehicle, with a sensor assembly 60 for detecting the occurrence of an accident. To this end, the electrical coupling 64 includes flexible printed circuitry 68 having one end 70 connected to the anchor ring 72. The opposite end 76 of the flexible printed circuitry 68 is connected to the outer anchor ring 78 which is fixedly secured to the steering column 16. The flexible printed circuitry 68 is loosely disposed between the steering post 74 and the steering column housing 80 to enable the slack in the flexible printed circuitry to be increased or decreased by rotation of the steering wheel 14 relative to the steering column 16. The closely spaced conductors 86 through 92 on the flexible strip or substrate 84 of the flexible circuitry 68 enables the flexible circuitry to be utilized for electrically connecting a plurality of steering wheel mounted actuators 26 with signal devices mounted on the vehicle.

Having described my invention, I claim:

1. Safety apparatus for protecting a driver of a vehicle having rotatable steering means during an accident, said safety apparatus comprising a confinement mounted on the steering means, said confinement having a collapsed condition and an expanded condition in which said confinement is adapted to restrain movement of the driver, electrically actuated means for effecting expansion of said confinement, said electrically actuated means being mounted for rotation with the steering means, electrical circuitry for effecting actuation of said electrically actuated means, said electrical circuitry including circuit means having one end portion mounted for rotation with the steering means and an opposite end portion operatively connected to a support assembly for said steering means, said circuit means comprising a flexible strip which enables the steering means to be rotated while maintaining electrical connection with said electrically actuated means.

2. Safety apparatus for protecting a driver of a vehicle as set forth in claim 1 further including actuator means mounted on the steering means for controlling the operation of a signal device mounted on the vehicle, said actuator means being electrically connected with said signal device by said circuit means.

3. Safety apparatus for protecting a driver of a vehicle as set forth in claim 1 wherein said circuit means further includes a plurality of conductors disposed on said flexible strip.

4. Safety apparatus for protecting a driver of a vehicle as set forth in claim 3 wherein said flexible strip is arranged in a spiral having slack which is increased and decreased by rotation of said steering wheel in opposite directions.

5. Safety apparatus for protecting a driver of a vehicle having a rotatable steering wheel, said safety apparatus comprising a safety device mounted on the steering wheel of the vehicle and adapted to protect the driver during an accident, said safety device being mounted for rotation with the steering wheel relative to a steering wheel support assembly, sensor means for detecting the occurrence of an accident, and electrical circuitry operatively connected with said safety device and said sensor means for actuating said safety device in response to operation of said sensor means, said electrical circuitry including a flexible strip of electrically insulating material operatively connected at one end portion with the steering wheel for rotation therewith and at an opposite end portion with the support assembly, said flexible strip having slack which is decreased by rotation of the steering wheel in one direction relative to the support assembly and increased by rotation of the steering wheel in an opposite direction relative to the support assembly and electrical conductor means for electrically connecting said sensor means with said safety device, said electrical conductor means including at least one conductor mounted on said flexible strip and extending between said end portions of said flexible strip to thereby enable the steering wheel and safety device to be rotated relative to the steering wheel support assembly while maintaining an electrical connection between said safety device and sensor assembly.

6. Safety apparatus as set forth in claim 5 further including a first ring of an electrically insulating material mounted for rotation with the steering wheel and connected with said one end portion of said flexible strip, a second ring of an electrically insulating material mounted on the steering wheel support assembly and connected with said opposite end portion of said flexible strip, said flexible strip being disposed in a generally spiral configuration between said rings.

7. Safety apparatus as set forth in claim 5 wherein said safety device includes a means expandable from a first condition to a second condition in which said expandable means is adapted to restrain movement of the driver during an accident, a source of fluid mounted on the steering wheel of the vehicle for inflating said expandable means, and explosive valve means connected to said electrical conductor means for controlling a flow of fluid from said source of fluid to said expandable means, said explosive valve means being actuatable from a closed condition blocking the flow of fluid from said source of fluid to said expandable means to a second condition enabling fluid to flow from said source of fluid to said expandable means.

8. Safety apparatus for protecting a driver of a vehicle having a steering wheel comprising means expandable from a first condition to a second condition in which said expandable means is adapted to restrain the driver of the vehicle during an accident, a source of fluid mounted on the steering wheel of the vehicle for expanding said expandable means, sensor means for detecting the occurrence of an accident, electrical means for electrically connecting said sensor means with said source of fluid to enable said source of fluid to be activated in response to said sensor means, signal means for providing a signal, selectively operable actuator means for operating said signal means, said actuator means being mounted on the steering wheel and electrically connected with said signal means by said electrical means, said electrical means including flexible printed circuit means having one end portion operatively connected to the steering wheel for rotation therewith and an opposite end portion operatively connected to a steering wheel support assembly, said flexible printed circuit means having slack which is decreased by rotation of the steering wheel in one direction relative to the support assembly and increased by rotation of the steering wheel in an opposite direction relative to said support assembly, a first group of electrical conductors for electrically connecting said one end portion of said flexible printed circuit means to said source of fluid and said actuator means, a second group of electrical conductors for electrically connecting said opposite end portion of said flexible printed circuit means to said sensor means and said signal means, said sensor means being operable upon the occurrence of an accident to complete an electrical circuit including said flexible printed circuit means and said first and second groups of electrical conductors to thereby effect the activation of said source of fluid to expand said expandable means to said second condition to protect the driver of the vehicle, said actuator means being selectively operable to complete another electrical circuit including said flexible printed circuit means and said first and second groups of electrical conductors to thereby effect the activation of said signal means to provide a signal.

9. Safety apparatus for portecting a driver of a vehicle as set forth in claim 8 wherein said flexible printed circuit means includes a flexible dielectric substrate and a plurality of conductors disposed on said substrate.

10. Safety apparatus for protecting a driver of a vehicle as set forth in claim 8 wherein said one end portion of said flexible printed circuit means is connected to a first ring of a dielectric material and said opposite end portion of said flexible printed circuit means is connected to said ring of a dielectric material located in a concentric relationship with said first ring, said flexible printed circuit means being disposed in a spiral between said concentric rings with the central axis of the spiral coaxial with the central axes of the rings.

11. Vehicle safety apparatus as set forth in claim 10 further including first and second disks of nonconductive material abutting opposite ends of at least one of said rings to enclose said flexible printed circuit means.

References Cited

UNITED STATES PATENTS

| | | |
|---|---|---|
| 2,842,372 | 7/1958 | D'Antini. |
| 3,028,445 | 4/1962 | Hurley _____ 174—117 X |

FOREIGN PATENTS

| | | |
|---|---|---|
| 609,624 | 9/1960 | Italy. |
| 869,275 | 5/1961 | Great Britain. |

KENNETH H. BETTS, Primary Examiner

U.S. Cl. X.R.

174—86; 339—3; 180—78